United States Patent [19]

Deak

[11] Patent Number: 4,800,129
[45] Date of Patent: Jan. 24, 1989

[54] MULTI-LAYER PLASTIC CONTAINER

[75] Inventor: Gedeon I. Deak, Wilmington, Del.

[73] Assignee: E. I. Du Pont de Nemours and Company, Wilmington, Del.

[21] Appl. No.: 30,425

[22] Filed: Mar. 26, 1987

[51] Int. Cl.$^4$ ........................ B32B 27/08; B32B 27/34
[52] U.S. Cl. ............................ 428/474.4; 428/475.2; 428/475.8; 428/476.1; 428/476.3; 428/480
[58] Field of Search ................. 428/474.4, 475.2, 480, 428/476.1, 476.3, 475.8; 525/432, 66; 524/538; 264/171

[56] References Cited

U.S. PATENT DOCUMENTS

| 3,642,941 | 2/1972 | Schneider et al. | 525/432 |
| 3,746,565 | 7/1973 | Schneider et al. | 428/474.4 |
| 4,120,928 | 10/1978 | Furukawa et al. | 264/171 |
| 4,404,317 | 9/1983 | Epstein et al. | 524/538 |
| 4,410,661 | 10/1983 | Epstein et al. | 525/66 |

FOREIGN PATENT DOCUMENTS

| 53-006355 | 1/1978 | Japan . |
| 55-062958 | 5/1980 | Japan . |
| 55-062959 | 5/1980 | Japan . |
| 61-188142 | 8/1986 | Japan . |

OTHER PUBLICATIONS

Abstract of Japanese 53/006355, 1-20-1978, Toray Ind. Inc.
Abstract of Japanese 55/062958, 5/12/80, Toray Ind. Inc.
Abstract of Japanese 55/062959, 5/12/80, Toray Ind. Inc.
English translation Japanese 61-188142A, Nakamura et al., Aug. 21, 1986.

Primary Examiner—Thomas J. Herbert

[57] ABSTRACT

Thermoformed multi-layer structures comprising at least a first and a second layer, the first layer comprising a blend of amorphous polyamides having a Tg greater than about 120° C. and one or more semicrystalline aliphatic polyamide and the second layer comprising a structural thermoplastic resin.

9 Claims, No Drawings

MULTI-LAYER PLASTIC CONTAINER

BACKGROUND OF THE INVENTION

This invention relates to thermoformed multilayer structures having at least one layer of a blend of an amorphous polyamide polymer having a Tg greater than about 120° C. with an aliphatic polyamide polymer and at least one layer of a structural thermoplastic polymer.

Containers and films with good gas barrier properties are needed for the packaging of perishable items such as foods, drinks, pharmaceuticals and cosmetics. Amorphous polyamides have been shown to possess both excellent oxygen barrier properties and optical properties and are therefore desired to be used in conjunction with other, often less expensive, structural materials, e.g., as in a multilayer film or container. Containers and films containing such amorphous polyamides can be made by thermoforming processes. For the purpose of this invention, thermoforming processes include any process for forming a shaped article (e.g., a film or a container) which is performed in a process which (a) is distinct from the initial melt processing step and (b) which is performed at a temperature which is elevated but substantially lower (e.g., by at least about 30° C.) than that required in the melt processing step. These thermoforming processes are performed on a semi-finished shaped article (often called a "preform") which was cast or molded from a molten polymer. Thus, for example, extrusion of a film would not be a thermoforming process according to this invention because it is a melt processing step; vacuum-forming the film to prepare a container would be a thermoforming process. Examples of thermoforming processes include thermoforming as the term is commonly used,(but excluding melt phase thermoforming), vacuum-forming, solid phase pressure forming, co-injection blow-molding, co-injection stretch blow-molding, tube extrusion followed by stretching, scrapless forming, forging and tubular or flat sheet oriented film processes. Examples of articles that can be prepared using thermoforming processes are films and containers such as bottles, jars, cans, bowls, trays, dishes and pouches.

A problem that arises in producing thermoformed articles incorporating amorphous polyamides is that the temperature required for thermoforming many of such polyamides (e.g , those with a glass transition temperature exceeding about 120° C.) is substantially higher than that of many of the structural materials desired to be used in conjunction with the amorphous polyamide and/or higher than that which available thermoforming processes and equipment can accommodate. Thus, for example, when one attempts to form a coinjection stretch blow-molded two-layer container from an amorphous polyamide (e.g., a copolymer of hexamethyldiamine with isophthalic and terephthalic acids) and polyethylene terephthalate (PET) at the forming temperature for the PET, an unsatisfactory result is likely to be achieved. Stretch blow-molding at the stretching temperature for the PET will produce a container with a non-uniform layer of amorphous polyamide because the polyamide is not stretchable at the stretching temperature for the PET. On the other hand, attempts to stretch blow mold at the stretching temperature for the amorphous polyamide will lead to a defective container because PET starts to crysatallize if it is heated above 100°–105° C., and the crystallization leads to reduced optical clarity. It is therefore an object of this invention to disclose a thermoformed multilayer structure having the optical and barrier properties provided by amorphous polyamides but capable of being thermoformed at temperatures less than the temperature required for thermoforming most amorphous polyamides.

SUMMARY OF THE INVENTION

This invention relates to a thermoformed multi-layer structure comprising at least a first and a second layer, said first layer comprising a blend of one or more amorphous polyamides having a Tg greater than about 120° C. and one or more semicrystalline aliphatic polyamides and said second layer comprising one or more structural thermoplastic resins. These structures have excellent gas barrier properties.

DETAILED DESCRIPTION OF THE INVENTION

The amorphous polyamides useful in this invention are those which are lacking in crystallinity as shown by the lack of an endotherm crystalline melting peak in a Differential Scanning Calorimeter test (ASTM D3417) and whose glass transition temperatures (Tg) are greater than about 120° C. (Tg is measured according to ASTM D-3418 and is the average of onset and endset temperature.) The amorphous polyamides of this invention are prepared from aliphatic diamines and aromatic di-acids. Examples of aliphatic diamines which can be used to prepare the amorphous polyamides are: hexamethylenediamine, 2,2,4-trimethyl hexamethylene diamine, 2,4,4-trimethyl hexamethylenediamine, 2-methyl pentamethylene diamine, bis-(4-aminocyclohexyl)-methane, 2,2-bis-(4-aminocyclohexyl)-isopropylidene, 1,4-(1,3)-diamino cyclohexane, 1,5-diaminopentane, 1,4-diaminobutane, 1,3-diaminopropane and 2-ethyl diaminobutane. Examples of aromatic dicarboxylic acids which can be used to prepare the amorphous polyamides are: isophthalic acid, terephthalic acid, and alkyl substituted iso- or terephthalic acid.

Specific examples of polyamides which can be used in the containers of this invention include: hexamethylenediamine isophthalamide, hexamethylenediamine iso/-terephthalamide, and mixtures of 2,2,4- and 2,4,4-trimethyl hexamethylenediamine terephthalamide. Preferred are the hexamethylenediamine iso/terephthalamides with ratios of iso- to tere- in the range of about 60/40 to 100/0. Most preferred are such polymers with ratios of iso-to tere- of about 70/30. Small amounts (0 to 5 mole % based on diamine) of 4,4-bis(aminocyclohexyl)methane may be incorporated in the polyamide. Other additives such as slip additives and thermal stabilizers may also be used.

The semicrystalline aliphatic polyamides used in this invention include addition polymers of amino acids, such as nylon 6, nylon 66, nylon 6,10 and nylon 6,10, and condensation polymers of hexamethylenediamine with dibasic acids such as succinic, adipic and sebacic acids. Copolymers and terpolymers of these aliphatic polyamides may also be used; e.g., copolymers of hexamethylene-diamine/adipic acid with caprolactam. To achieve a blend with amorphous polyamide with good optical properties, the aliphatic polyamide should preferably have a ratio of nitrogen to carbon atoms of at least 0.12, preferably at least 0.14.

By blending amorphous polyamides with semicrystalline aliphatic polyamides according to this invention, the temperature at which the amorphous polyamides can be thermoformed (the "forming temperature") is lowered substantially, e.g., to 125° C. or less. The forming temperature of a polymer is not readily related to any material properties of the polymer except that it is normally higher than the Tg of the polymer. Many factors influence the choice of forming temperature, e.g., the polymer itself, the forming process and machinery. Generally speaking, however, there are many advantages to utilizing lower forming temperatures. Obviously, there are economic advantages to heating the polymers to as low a temperature as possible. Lower forming temperatures may also lead to thermoformed articles with superior physical and optical properties. For example, lower forming temperatures often result in articles with higher modulus and greater strength. Finally, lowering the forming temperature of the amorphous polyamide broadens the scope of structural materials which can be used in conjunction therewith, as previously indicated.

The amorphous polyamide and the aliphatic polyamide may be blended using methods well known in the art. The ratio of amorphous polyamide to aliphatic polyamide should be that required to achieve a blend with the desired forming temperature, i.e., at or near that of the structural thermoplastic layer in the multilayer structure. This will generally be in the range of 90/10 to 60/40 amorphous polyamide/aliphatic polyamide, and preferably in the range of 85/15 to 70/30. The ideal ratio will vary from blend to blend. For example, a 70/30 blend of the amorphous polyamide derived from hexamethylenediamine and 70/30 iso-terephthalic acids with nylon 6 is amorphous, i.e., shows no crystallinity which would detract from the optical properties. A 60/40 blend of the same polymers shows distinct crystallization and would not have the same high level of optical properties. Either blend would have the desired lowered forming temperature and would lead to a multilayer structure with the desired low oxygen permeability; however, the latter blend might not be suitable for some uses because crystallinity would lead to poor optical properties. Blends with excellent optical properties are preferred, e.g., blends which, when cast on a chill roll to make single layer films 0.13 to 0.25 mm thick, have a haze value of less than about 8%, preferably less than about 3%.

As previously indicated, the second layer in the multilayer structure of this invention comprises a structural thermoplastic resin or blend of such resins. Generally, the structural thermoplastic resin will have a Tg less than about 110° C., preferably less than about 100° C. and a forming temperature lower than 125° C. Examples are copolymers of olefins with vinyl acetate or acrylic acid esters, ionomers, polyethylene terephthalate, ethylene homopolymers, polystyrene and copolymers and blends thereof. Preferred thermoplastic polymers include polyethylene terephthalate; polyvinylchloride; linear and branched polyethylenes; co- and terpolymers of ethylene with vinyl acetate, acrylic acid or methacrylic acid, and ionomers obtained by partially neutralizing such acid copolymers.

In the multilayer structures of this invention, it may often be desirable to interpose between said first layer of polyamide blend and said second layer of structural thermoplastic polymer a resin having adhesion to both such layers. Many adhesive resins are known in the art which would serve this purpose. In general, such adhesive resins are thermoplastic polymers having carbonyl groups derived from functional groups of free carboxylic acids, carboxylic acid salts, carboxylic acid esters, carboxylic acid amides, carboxylic anhydrides, carbonic acid esters, urethanes, ureas or the like. In these thermoplastic polymers, the carbonyl group concentration may be changed in a broad range, but in general, it is preferred to use a thermoplastic polymer containing carbonyl groups at a concentration of 10 to 1400 millimoles per 100 g of the polymer, especially 30 to 1200 millimoles per 100 g of the polymer. Suitable adhesive resins include polyolefins modified with at least one ethylenically unsaturated monomer selected from unsaturated carboxylic acids and anhydrides, esters and amides thereof, especially polypropylene, high density polyethylene, low density polyethyelene and ethylene-vinyl acetate copolymers modified with at least one member selected from acrylic acid, methacrylic acid, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides and imides of the acids described above. U.S. Pat. No. 4,230,830, the disclosure of which is hereby incorporated by reference, discloses resins particularly suitable for use with nylons. In addition, as the adhesive resin, there can be used ethylene-acrylate copolymers, ionomers, polyalkylene oxide-polyester block copolymers, carboxylmethyl cellulose derivaties, and blends of these polymers with polyolefins.

The multilayer structures of this invention have a minimum of two layers, the first layer of polyamide blend and the second layer of structural thermoplastic resin. In some cases the structures have a third layer of an adhesive resin. The structures may also have five or more layers, e.g., two outer layers of the structural thermoplastic resin, an inner layer of the polyamide blend, two or more layers of adhesive resin, and other inner thermoplastic resin layers as desired.

By virtue of the incorporation of the layer of amorphous polyamide, the multilayer structures of this invention have excellent barrier properties. The oxygen permeability of the layer of amorphous polyamide will generally be less than 0.04 cc.cm/sqm.day.Atm. In terms of a multilayer container, a can shaped, cylindrical container, 68 mm diameter, 102 mm tall, with a layer of amorphous polyamide 0.025 mm thick, would be expected to have an oxygen transmission of less than 0.1 cc/day. Permeability values referred to are measured at a temperature of 23° C. and a relative humidity between 80 and 100%.

Structures of this invention are illustrated in the following examples.

EXAMPLE 1

A blend of 80 parts amorphous polyamide (condensation polymer of hexamethylenediamine with a 70/30 ratio of isophthalic and terephthalic acids) with 20 parts polycaprolactam (nylon 6) was prepared by melt blending on a 30 mm twin screw melt processor at a melt temperature in the 240 to 250 degree C. range, 150 rpm speed, and a rate of 9 lbs./hr. This polymer blend was extruded into a strand, cooled and cut into pellets and is designated as Sample A.

Several three-layer, coextruded film samples, approximately 0.175 mm thick, were prepared using as one of the surface layers a 0.08 mm thick layer of Sample A or, in control samples, the unmodified amorphous polyamide. The other surface layer was made of a blend of:

98 parts of an ethylene methacrylic acid copolymer in a 90/10 ratio, 50% neutralized with sodium, melt index + 1.2, and 2 parts of a blend of 85% ethylene methacrylic acid copolymer in a 90/10 ratio, 10% oleyl palmitamide, 5% silica.

A core adhesive layer comprised a blend of 90% ethylene vinyl acetate copolymer (18% VA content) and 10% maleic-anhydride grafted ethylene/propylene/-hexadiene terpolymer. The Sample A or control amorphous polyamide were extruded using a 25 mm extruder at 30 rpm and 240 deg C. melt temperature. The other surface layer was extruded using a 38 mm extruder at 12 rpm and 237 deg C. melt temperature. The adhesive layer was extruded using a 32 mm extruder at 5 rpm and 222 deg C. melt temperature. The extruded film was cooled on a series of two chill rolls, 300 mm diameter. The first roll was cooled with 85 deg C. temperature water, the second with 22 deg C. water. The finished film was wound up at a velocity of 2.4 m/min.

The film samples so prepared were thermoformed on a sheet vacuumformer Model 222, made by the Brown Machine Company of Beaverton MICH. The mold was for making 96 mm diameter and 38 mm deep cups. To thermoform the sheet samples they were preheated in a heating chamber equipped with infrared radiant heaters. The heating time was determined by the temperature of the film sample, which was measured with Thermolabels, made by the Paper Thermometer Company of Greenfield, N. H. These labels have an adhesive backing and are attached to the film sample adjacent to the area to be thermoformed. When the desired temperature was reached, preheating was terminated by moving the sample sheet into the mold position followed by the automatic activation of the mold. If the preheat temperature was too low, the force provided by the vacuum was not sufficient, and no or very little forming was accomplished. The lowest temperature at which the cup could be almost completely formed was defined as the lower temperature limit of thermoformability (LTLT) for a given structure. The LTLT of the film made with Sample A was measured to be 110 deg C. The LTLT of the film made with the unmodified amorphous polyamide was measured to be 143 deg C.

EXAMPLE 2

Three layer films were coextrusion cast, with a core layer selected from Sample A of Example 1, from the unmodified amorphous polyamide of Example 1, and from Sample B, a blend of 80 weight % of the amorphous polyamide of Example 1 and 20 weight % nylon 6,12 (condensation copolymer of HMDA and dodecanoic acid). The core layer was approximately 0.075 mm thick, extruded with a 25 mm extruder at 10 rpm and 216 deg C. melt temperature. Surface layers were polypropylene (PP), each approximately 0.25 mm thick. The structures were cast at a velocity of 1 m/min. and cooled by two 300 mm diameter chill rolls cooled with 70 deg C. circulating water. Since the adhesion between the nylon and the PP surface layers was nil, they could be readily separated and the PP layers discarded. The residue was a series of single layer films of the nylon or nylon blends which were made under coextrusion conditions.

Tensile tests performed on these film samples at elevated temperatures show that the yield strengths, or the forces needed to thermoform these films, were substantially smaller for Sample A, and to a lesser extent for Sample B, than for the unmodified amorphous polyamide. Also, the maximum elongations of the Samples A and B were substantially greater than those of the unmodified amorphous polyamide. The data are presented below in Table 1. These tensile tests represent a thermoforming process under laboratory conditions. The tests were performed on 12.7 mm wide and 25.4 mm long samples (between the jaws of the tensile tester) at a stretching speed of 500 mm/min. The haze values, oxygen permeabilities and glass transition temperatures of these film samples are shown in Table 2.

TABLE 1

|  | Temp, °C. | Controls I | II | A | B |
|---|---|---|---|---|---|
| Yield Strength | 75 | 49.6, | 53.8 | 9.7 | 37.2 |
| Mpa | 100 | 42.1, | 49.6 | 6.2 | 22.8 |
|  | 125 | 35.9, | — | 1.4 | 13.8 |
|  | 150 | —, | 1.4 | 0.7 | 0.7 |
| Elongation | 75 | 8, | 236 | 273 | 261 |
| % | 100 | 5, | 23 | 180 | 204 |
|  | 125 | 12, | — | 659 | 147 |
|  | 150 | —, | 475 | 312 | 789 |

Both Controls are the unmodified amorphous polyamide of Example 1. Cast film samples were 0.05 to 0.10 mm thick. Testing was done in the machine direction.

TABLE 2

| Core Layer Composition | Haze, % | OPV | $T_g$, C |
|---|---|---|---|
| Unmodified amorphous polyamide | 12.9 | 20.8 | 123 |
| Sample A | 8.8 | 21.2 | 99 |
| Sample B | 77.2 | 25.7 | 118 |

(Haze measured by ASTM D-1003; OPV in cc.mil/sqm.Day.Atm and measured by ASTM D-3985; Tg measured by ASTM D-3418 and is the average of onset and endset temperatures)

The data for Sample B indicate that it would not be satisfactory for use in applications where good optical properties are desired.

EXAMPLE 3

Samples C, D, E and F were prepared by mixing the components shown in Table 3, and melt blending the mixture in a 25 mm diameter single screw melt processor (extruder), working at 100 rpm speed and with a melt temperature between 260 and 282 deg C. The samples were extruded into a strand at a rate between 3.6 and 4.5 kg/hr, cooled in water and cut into pellets.

Samples C-F, the unmodified polyamide of Example 1, and an unmodified Nylon 6 polymer were chill roll cast using the same 25 mm diameter single screw extruder, 70 rpm, approximately 270 to 280 deg C. melt temperature; a flat film die maintained at 266 deg C. temperature and with 0.75 mm die gap; and a 200 mm diameter chill roll with a surface speed of 0.75 m/min., cooled with 100 deg C. water. The samples were 0.25 and 0.13 mm thick. These film samples were thermoformed on the equipment and using the procedures described in Example 1. The LTLT as defined in Example 1 was determined and is listed in Table 3 along with data for the optical properties and glass transition temperatures of the samples.

TABLE 3

| Composition | Haze | OPV | LTLT | $T_g$ |
|---|---|---|---|---|
| Unmodified amorphous polyamide (PA) | 1.05 | 23.4 | 177 | 128 |
| 90/10 PA/Nylon 6 | 0.80 | 20.0 | 149 | 113 |
| 80/20 PA/Nylon 6 | 0.75 | 30.1 | 132 | 100 |

TABLE 3-continued

| Composition | Haze | OPV | LTLT | $T_g$ |
|---|---|---|---|---|
| 70/30 PA/Nylon 6 | 1.15 | 48.5 | 132 | 95 |
| 80/20 PA/Nylon 66,6 | 2.20 | 30.4 | 132 | 99 |
| Unmodified Nylon 6 | 0.85 | 105. | >200 | 107 |

(LTLT is in deg C.; Haze, OPV, $T_g$ are in units and are measured as in Example 2)

These data indicate that, surprisingly, the Tg's for several of the blends are less than the Tg's for either of the blend components. These data also indicate that the minimum forming temperature (LTLT) of the blends are lower than those of either of the components in the blend alone.

EXAMPLE 4

Samples G and H were prepared by mixing pellets of the components recited in Table 4. Using these samples, the unmodified amorphous polyamide of Example 1, or unmodified nylon 6 as one of the surface layers, three layer coextruded films were prepared. The equipment and process described in Example 1 was used. The other surface layer in these films was a low density polyethylene with a melt index of 4.5. The polyethylene was extruded on the 38 mm extruder at 20 rpm, with a melt temperature of 235 deg C. The overall thickness was 0.175 mm, with the polyamide layer comprising approximately 0.075 mm of the total. The third layer was the adhesive used in Example 1.

The coextruded film samples were thermoformed according to the procedure described in Example 1. The LTLT values for each sample were determined and are shown in Table 4, along with the optical properties and oxygen permeabilities of the films. Also presented in the table are the glass transition temperatures of the polyamide layer.

TABLE 4

| Composition | Haze | OPV | LTLT | $T_g$ |
|---|---|---|---|---|
| Unmodified amorphous polyamide (PA) | 24.2 | 7.9 | 132 | 128 |
| 80/20 PA/Nylon 6 | 23.3 | 8.4 | 82 | 100 |
| 80/20 PA/Nylon 66.6 | 23.0 | 8.7 | 93 | 98 |
| Unmodified Nylon 6 | 41.2 | 29.4 | 115 | 107 |

(LTLT is in deg C.; Haze, OPV, $T_g$ are in units and are measured as in Example 2)

EXAMPLE 5

A blend of 80 parts of the unmodified amorphous polyamide of Example 1 and 20 parts of a copolymer of HMDA, adipic acid and caprolactam was prepared by melt blending on a 30 mm twin-screw melt processor, at melt temperature of 270 deg C., 150 rpm speed, and a rate of 15 lbs/hr. The polymer blend was extruded into a strand, cooled, cut into pellets, and designated Sample K.

Polyethylene terephthalate (PET) homopolymer and Sample K were successfully co-injection stretch blow molded (using machinery manufactured by the Nissei ASB Company) into 185 cc bottle shaped containers, with Sample K sandwiched between two layers of PET. The Sample K layer extended over the entire surface of the bottles.

Attempts were made to make similar bottles with PET and the unmodified amorphous polyamide. The bottles made were defective in that the amorphous polyamide layer covered less than half of the surface area of the bottles, failing to provide the expected gas barrier performance. The reason for the incomplete coverage with the amorphous polyamide was that, at the PET stretching temperature (95 to 105 deg C.), the amorphous polyamide was not stretchable.

What is claimed is:

1. A thermoformed multi-layer structure comprising at least a first and second layer, said first layer comprising a blend of 70–85% of an amorphous polyamide having a Tg greater than about 120° C. which is a hexamethylenediamine iso/terephthalamide with a ratio of iso- to tere- phthalamide in the range of about 60/40 to 100/0, with 15–30% of one or more semicrystalline aliphatic polyamides and said second layer comprising one or more structural thermoplastic resins.

2. A thermoformed multi-layer structure of claim 1 where the blend in said first layer comprises 70% amorphous polyamide and 30% semicrystalline aliphatic polyamide.

3. A thermoformed multi-layer structure of claim 1 where said structural thermoplastic resin has a Tg of less than about 110° C.

4. A thermoformed multi-layer structure of claim 1 where said structural thermoplastic resin is selected from polyethylene terephthalate, polystyrene, polyvinyl chloride, linear and branched polyethylenes, co- and terpolymers of ethylene with vinyl acetate acrylic acid or methacrylic acid, and ionomers obtained by partially neutralizing such acid copolymers.

5. A thermoformed multilayer structure of claim 1 in which a layer of adhesive resin is interposed between said first layer and said second layer.

6. A thermoformed multi-layer structure of claim 1 where the ratio of nitrogen to carbon atoms in said semicrystalline aliphatic polyamide is at least 0.12.

7. A thermoformed multi-layer structure of claim 6 where said semicrystalline aliphatic polyamide is selected from nylon 6, nylon 66.6, nylon 6,10 and copolymers thereof.

8. A thermoformed multi-layer structure of claim 1 where said semicrystalline aliphatic polyamide is selected from nylon-6, nylon 66.6, nylon 6,10 and copolymers thereof.

9. A thermoformed multi-layer structure of claim 8 where said thermoplastic resin is selected from polyethylene terephthalate, polyvinyl chloride, linear and branched polyethylenes, co- and terpolymers of ethylene with vinyl acetate acrylic acid or methacrylic acid, and ionomers obtained by partially neutralizing such acid copolymers.

* * * * *